(12) United States Patent
Denda

(10) Patent No.: US 12,523,263 B2
(45) Date of Patent: Jan. 13, 2026

(54) FRICTION PART FOR A FRICTIONALLY WORKING DEVICE

(71) Applicant: Schaeffler Technologies AG & Co. KG, Herzogenaurach (DE)

(72) Inventor: Christian Denda, Achern (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 401 days.

(21) Appl. No.: 18/018,867

(22) PCT Filed: Jul. 6, 2021

(86) PCT No.: PCT/DE2021/100586
§ 371 (c)(1),
(2) Date: Feb. 17, 2023

(87) PCT Pub. No.: WO2022/033625
PCT Pub. Date: Feb. 17, 2022

(65) Prior Publication Data
US 2024/0183407 A1 Jun. 6, 2024

(30) Foreign Application Priority Data
Aug. 11, 2020 (DE) ...................... 10 2020 121 106.6

(51) Int. Cl.
*F16D 13/64* (2006.01)
*F16D 13/72* (2006.01)
(Continued)

(52) U.S. Cl.
CPC ........... *F16D 13/648* (2013.01); *F16D 13/72* (2013.01); *F16D 13/74* (2013.01); *F16D 65/122* (2013.01);
(Continued)

(58) Field of Classification Search
CPC ........ F16D 13/648; F16D 13/72; F16D 13/74; F16D 65/122; F16D 65/127;
(Continued)

(56) References Cited

U.S. PATENT DOCUMENTS 6,019,205 A * 2/2000 Willwerth ............... F16D 13/64
29/417
6,712,190 B2 * 3/2004 Kitaori .................. F16D 25/123
192/113.36
(Continued)

FOREIGN PATENT DOCUMENTS

DE 102015213946 A1 2/2016
EP 0625647 A1 11/1994
(Continued)

*Primary Examiner* — Timothy Hannon

(57) ABSTRACT

A friction part for a frictionally working device includes a plurality of friction lining elements arranged to form a circular disk-shaped friction surface having radial slots disposed between the friction lining elements. The radial slots are arranged to receive a coolant or lubricant traversing from a radial inside of the friction surface to a radial outside of the friction surface. The conformation of the friction lining elements and the arrangement of the friction lining elements relative to one another are optimized with regard to an interdependency between a drawing-in of air and a separation behavior of the frictionally working device, and drag losses. The radial slots may extend in a diffuser-like manner from the radial inside to the radial outside, or the radial slots may narrow in a nozzle-like manner from the radial inside to the radial outside.

6 Claims, 4 Drawing Sheets

(51) Int. Cl.
  *F16D 13/74*   (2006.01)
  *F16D 65/12*   (2006.01)
  *F16D 65/02*   (2006.01)
  *F16D 69/00*   (2006.01)

(52) U.S. Cl.
  CPC ......... *F16D 65/127* (2013.01); *F16D 65/128* (2013.01); *F16D 2065/1324* (2013.01); *F16D 2069/004* (2013.01); *F16D 2069/009* (2013.01)

(58) Field of Classification Search
  CPC ........... F16D 65/128; F16D 2065/1324; F16D 2065/1328; F16D 2069/004; F16D 2069/009
  See application file for complete search history.

(56) References Cited

U.S. PATENT DOCUMENTS

| | | | |
|---|---|---|---|
| 10,465,753 | B2 | 11/2019 | Hartner et al. |
| 2005/0126878 | A1 | 6/2005 | Samie |
| 2006/0236523 | A1* | 10/2006 | Guthrie ................. F16D 23/025 29/557 |
| 2007/0017773 | A1 | 1/2007 | Suzuki et al. |
| 2008/0006504 | A1* | 1/2008 | Sudau ................... F16D 13/648 192/113.36 |
| 2012/0118696 | A1 | 5/2012 | Fabricius |
| 2012/0298463 | A1* | 11/2012 | Tokumasu ............ F16D 13/648 192/66.3 |
| 2013/0168199 | A1* | 7/2013 | Higashijima ......... F16D 13/648 192/107 M |
| 2014/0346003 | A1 | 11/2014 | Okamura |
| 2019/0048954 | A1* | 2/2019 | Bernhardt ............... F16D 13/74 |
| 2019/0249737 | A1 | 8/2019 | Hoshino |
| 2020/0224732 | A1* | 7/2020 | Miyagawa ............ F16D 65/186 |

FOREIGN PATENT DOCUMENTS

| | | |
|---|---|---|
| EP | 2066911 A1 | 6/2009 |
| EP | 3643940 A1 | 4/2020 |
| JP | H08200394 A | 8/1996 |
| JP | 2003090370 A | 3/2003 |
| JP | 2011127687 A | 6/2011 |
| JP | 2019007533 A | 1/2019 |
| WO | 2017016555 A1 | 2/2017 |

* cited by examiner

FRICTION PART FOR A FRICTIONALLY WORKING DEVICE

CROSS-REFERENCE TO RELATED APPLICATIONS

This application is the United States National Phase of PCT Appln. No. PCT/DE2021/100586 filed Jul. 6, 2021, which claims priority to German Application No. DE102020121106.6 filed Aug. 11, 2020, the entire disclosures of which are incorporated by reference herein.

TECHNICAL FIELD

The present disclosure relates to a friction part for a frictionally working device, having friction lining elements which are arranged with slots between one another so as to form a friction surface in the form of a circular disk. The slots can be traversed from radially inside to radially outside, in the radial direction with respect to the friction surface, by a coolant and/or lubricant, in which context drag losses arise and air is drawn in with the coolant and/or lubricant.

BACKGROUND

The friction lining elements are also referred to as friction segments, friction lining segments or pads. The friction lining elements may be attached to a lining carrier on both sides. A variety of slot patterns can be formed via the conformation, size and arrangement of the friction lining elements. By way of example, reference is made to the documents EP 0 625 647 B1, EP 2 066 911 B1, U.S. Pat. Nos. 5,094,331 and 5,335,765.

SUMMARY

The disclosure provides a friction part for a frictionally working device, having friction lining elements which are arranged with slots between one another so as to form a friction surface in the form of a circular disk. The slots can be traversed from radially inside to radially outside, in the radial direction with respect to the friction surface, by a coolant and/or lubricant, in which context drag losses arise and air is drawn in with the coolant and/or lubricant. The conformation of the friction lining elements and the arrangement of the friction lining elements relative to one another are optimized while taking into account the interdependencies between the drawing-in of air and a separation behavior of the frictionally working device with respect to the drag losses. The undesirable drag losses may occur in an open state of a frictionally working device that is equipped with the friction part, e.g., with several friction parts. As requirements increase, especially in connection with new drive concepts, it is important to minimize drag losses. Various slot patterns are proposed with the disclosed friction part, with which the pressure levels and the pressure distributions in the lubricating gaps or in the slots are minimized. In particular, the causal relationships of the drawing-in of air and/or separation behavior and their effect on the drag losses are taken into account.

An exemplary embodiment of the friction part includes friction lining elements that are designed and relatively spaced apart from one another in such a way that radial slots extend in a diffuser-like manner in the radial direction in relation to the friction surface from radially inside to radially outside. In this way, the pressure in the slot can be reduced during operation of the frictionally working device. This shifts the drawing-in of air to lower engine speeds.

Another exemplary embodiment of the friction part includes friction lining elements that are designed and spaced apart from one another in such a way that radial slots narrow in a nozzle-like manner in the radial direction in relation to the friction surface from radially inside to radially outside. This creates a pressure increase in the slots. A uniform distribution of clearances can thus be created in the open state of the frictionally working device.

In a further exemplary embodiment, the two exemplary embodiments with the diffuser-like extended sections and the nozzle-like narrowing sections are combined with one another in a friction part. The exemplary embodiments can, for example, be implemented alternately in the circumferential direction in segments of the friction surface.

Another embodiment of the friction part includes at least two friction lining elements, adjacent in the circumferential direction relative to the friction surface, having bevels radially facing one another on the inside so as to form a type of funnel at the start of a radial slot provided between the adjacent friction lining elements. Thus, in the closed state of the frictionally working device, a lubricating wedge is created, which supports separation when opening. In addition, a gentle closing of the frictionally working device is made possible. A radial slot that is adjacent in the circumferential direction may be equipped without a funnel at its start. As a result, the risk of the friction part undesirably floating when the frictionally working device is closed can be reduced.

A further embodiment of the friction part includes at least two friction lining elements, which are adjacent in the circumferential direction relative to the friction surface, having bevels radially facing one another on the outside so as to form a type of funnel at the end of a radial slot provided between the adjacent friction lining elements. As a result, the drawing-in of air can be improved with a slight reduction in the frictional contact area, e.g., the surface pressure.

A further exemplary embodiment of the friction part includes friction lining elements having the conformation of isosceles trapezoids or acute-angled triangles. The desired effect can be further optimized with such friction lining elements or friction lining pads.

A further exemplary embodiment of the friction part includes radial slots that are connected to one another by tangential slots, and the friction lining elements are divided in the radial direction to form the tangential slots. The increased design and manufacturing complexity is consciously accepted in order to produce an improved distribution of the air in the lubricating gap, i.e., in the slots. Adjacent tangential slots may be offset from one another in the radial direction. As a result, the wear during operation of the frictionally working device can be minimized.

A further exemplary embodiment of the friction part includes friction lining elements having a recess radially on the outside and/or radially on the inside in relation to the friction surface, which serves to form an additional blind slot. The blind slot on the outer diameter creates a dead center in the medium flow, which improves the drawing-in of air and reduces the drag torque. The blind slot on the inner diameter of the friction surface causes the medium to accumulate in the lubricating gap or in the slots and leads to improved separation of the friction surfaces. In the closed state, the blind slots improve the cooling effect of the medium, since the convective transition is improved in the blind slot.

A further exemplary embodiment of the friction part includes the recess having the conformation of a rectangle which is rounded off at a blind slot end. This has proven to be advantageous with regard to undesired floating of the friction part.

The present disclosure further relates to a wet-running clutch or brake, e.g., a wet-running multi-disk clutch or multi-disk brake, having at least one friction part as described above. Several friction parts may be arranged between two steel disks of a disk clutch or disk brake. The wet-running clutch is designed as a single clutch or as a double clutch. The wet-running clutch or brake may be used in hybrid modules or in connection with switchable e-axles.

BRIEF DESCRIPTION OF THE DRAWINGS

Further advantages, features and details of the disclosure will be apparent from the following description, in which various exemplary embodiments are described in detail with reference to the drawing. In the figures.

DETAILED DESCRIPTION

Figure 1:
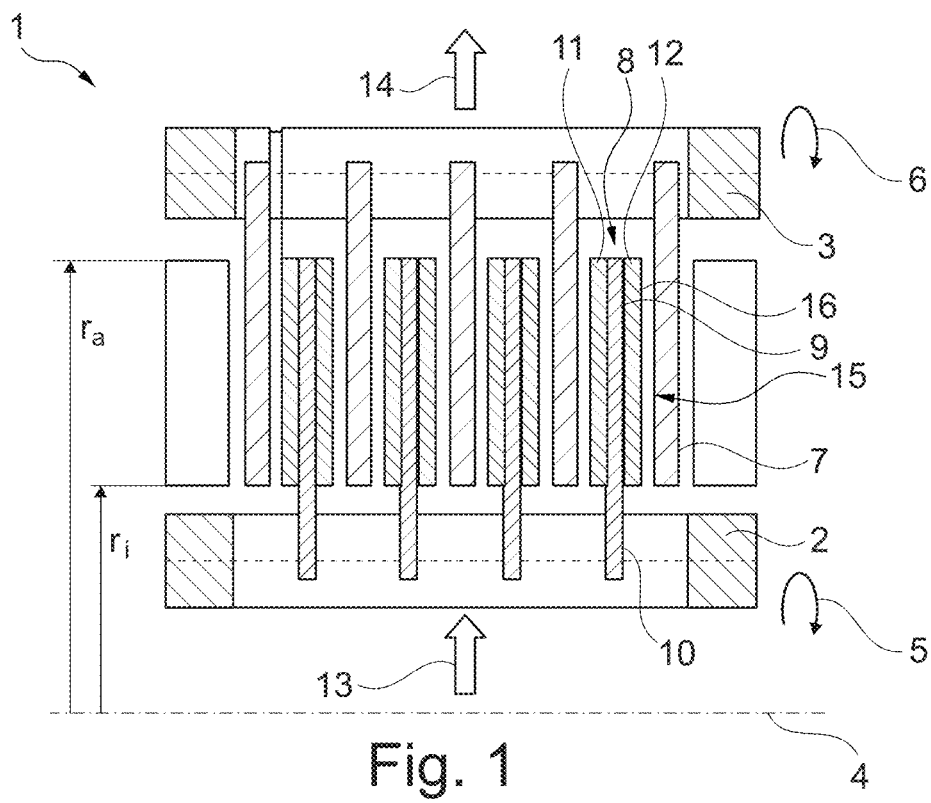
FIG. 1 shows a schematic representation of a half section of a frictionally working device designed as a wet-running multi-disk clutch.

In FIG. 1, a half section of a frictionally working device designed as a wet-running multi-disk clutch 1 is shown schematically. The wet-running multi-disk clutch 1 includes an inner disk carrier 2 and an outer disk carrier 3. The two disk carriers 2, 3 can be rotated relative to one another about an axis of rotation 4 independently of one another at different rotation speeds, which are indicated by arrows 5, 6.

A disk pack of the wet-running multi-disk clutch 1 includes steel disks 7 and lined disks 8. The lined disks 8 each include a lining carrier 9 which is connected to the inner disk carrier 2 in a rotationally fixed manner radially on the inside of a coupling region 10. The coupling region 10 of the lining carrier 9 is designed, for example, as an internal toothing that is meshed with a complementary external toothing of the inner disk carrier 2. Similarly, the steel disks 7 are connected to the outer disk carrier 3 in a rotationally fixed manner radially on the outside.

Friction linings 11, 12 are fastened on both sides of the lining carrier 9, i.e., on the left and right in FIG. 1. The design and function of a wet-running multi-disk clutch 1 are known per se and will not be explained further here. An arrow 13 indicates a cooling and/or lubricating medium which emerges radially on the inside through the inner disk carrier 2 into the disk pack of the wet-running disk clutch 1. An arrow 14 indicates that the cooling and/or lubricating medium exits the outer disk carrier 3 radially on the outside.

The cooling and/or lubricating medium is primarily used for cooling in the wet-running multi-disk clutch 1. The lining disk 8 with the lining carrier 9 and the two friction linings 11, 12 is also referred to as the friction part 15. The friction part 15 has a friction surface 16 shown on the right in FIG. 1, facing the steel disk 7.

The friction surface 16 is delimited radially on the inside by an inner radius $r_i$. The friction surface 16 is delimited radially on the outside by an outer radius $r_a$. On the left of FIG. 1, the friction part 15 includes a further friction surface, not designated in any further detail, which faces the adjacent steel disk. For torque transmission, the friction part 15 can be clamped with its annular disk-like friction surfaces 16 in each case between two adjacent steel disks 7.

Figure 2:
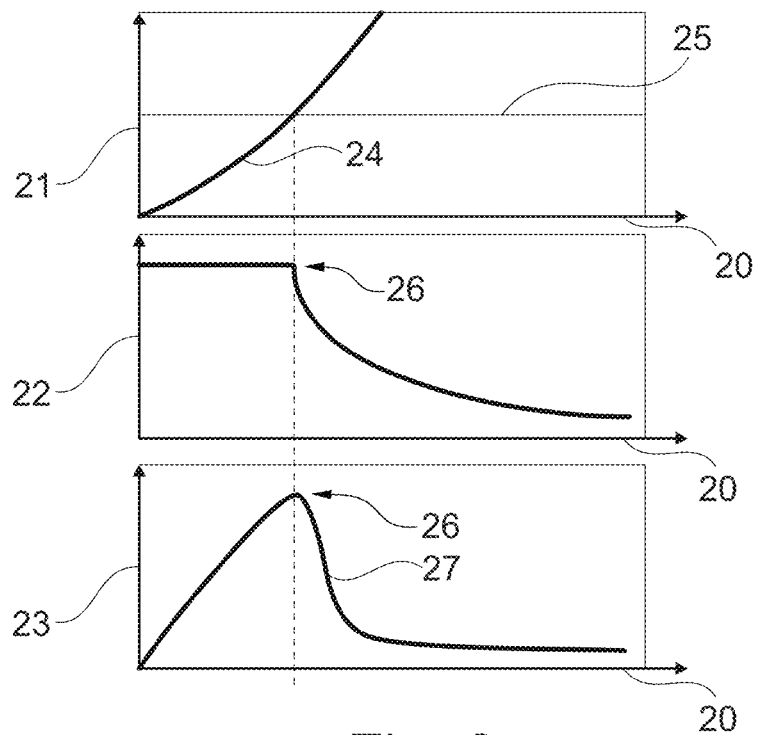
FIG. 2 shows three Cartesian coordinate diagrams in which a volume flow, a gap fill level and a drag torque are each plotted against a rotation speed of the frictionally working device of FIG. 1.

In FIG. 2, three Cartesian coordinate diagrams are shown one above the other. A rotation speed during operation of the wet-running multi-disk clutch 1 with the friction part 15 is plotted in a suitable unit on an x-axis 20. A volume flow is plotted in a suitable unit on a y-axis 21. A gap fill level is plotted in a suitable unit on a y-axis 22. A drag torque is plotted in a suitable unit on a y-axis 23.

FIG. 2 illustrates how air is drawn in 26 by a drawn-in volume flow 24 when this exceeds the supplied volume flow 25. From this limit, the gap fill level 26 decreases and the lubricating gap between the disks contains air. Above this limit, a supplied volume flow contains 25 air. The bottom of FIG. 2 shows that the drawing-in of air 26 occurs at a maximum drag torque 27.

Figure 3:
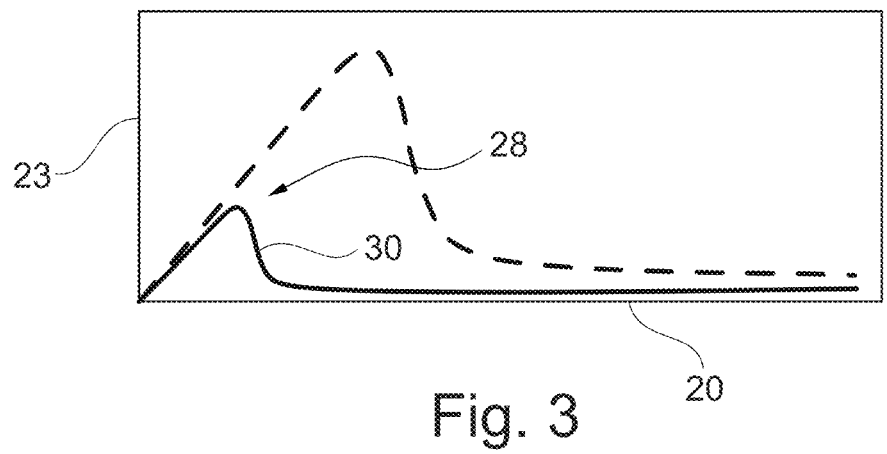
FIG. 3 shows a Cartesian coordinate diagram with an improved drag torque curve over the rotation speed.

FIG. 3 shows how a displacement of the drawing-in of air 28 to a low rotation speed in a drag torque curve 30 is achieved with the claimed friction part 15. The conveying effect of the cooling and/or lubricating medium can be improved by the slot pattern shown in FIGS. 4 to 12.

In each of FIGS. 4 to 12, a section of the friction surface 16 of the friction part 15 of FIG. 1 is shown schematically in a plan view. An inner diameter of the friction surface 16 is denoted by Di. An outer diameter of the friction surface 16 is denoted by Da.

Figure 4:
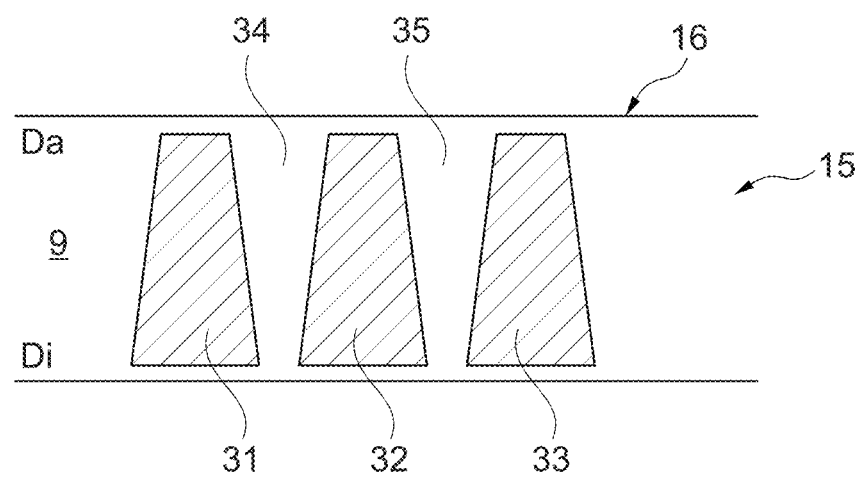
FIGS. 4 to 12 each show a schematic and sectional representation of a friction part with differently designed and arranged friction lining elements in a plan view.

The friction part 15 shown in FIG. 4 includes three friction lining elements 31 to 33 in the section of the friction surface 16 depicted. The friction lining elements or friction lining pads 31 to 33 have the conformation of isosceles trapezoids, the dimension of which in the circumferential direction decreases from the inner diameter Di to the outer diameter Da of the friction surface 16.

Radial slots 34, 35 between the friction lining elements 31, 32 and 32, 33 therefore extend in a diffuser-like manner from radially inside to radially outside. As a result, an additional pressure reduction in the slots 34, 35 is generated. In this way, the drawing-in of air (28 in FIG. 3) can be shifted toward low rotation speeds. This significantly reduces the drag torque (30 in FIG. 3).

Figure 5:
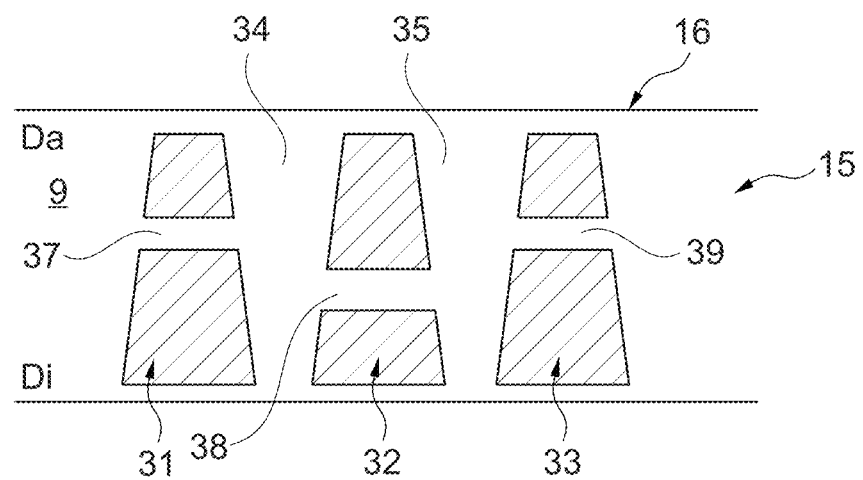

In the exemplary embodiment illustrated in FIG. 5, tangential slots 37, 38, 39 are provided in addition to the radial slots 34, 35. The friction lining elements 31 to 33 are interrupted to show the tangential slots 37 to 39.

The additional tangential slots 37 to 39 produce an improved distribution of air in the slots, which are also referred to as a lubricating gap in their entirety. In order not to worsen the contact pattern in the friction surface 16, the tangential slot 38 is offset radially inward in the radial direction relative to the tangential slots 37, 39.

Figure 6:
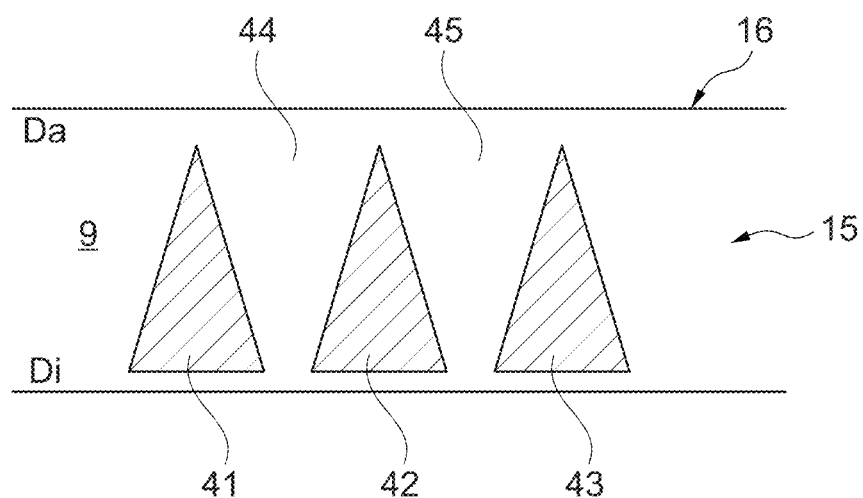

FIG. 6 shows that the trapezoidal friction lining elements 31 to 33 shown in FIG. 4 can also be replaced by triangular friction lining elements 41 to 43 in some cases. The resulting radial slots 44, 45 extend radially outwards much more than in FIG. 4. The slots 44 and 45 in FIG. 6 can also be combined with tangential slots (37 to 39 in FIG. 5).

Figure 7:
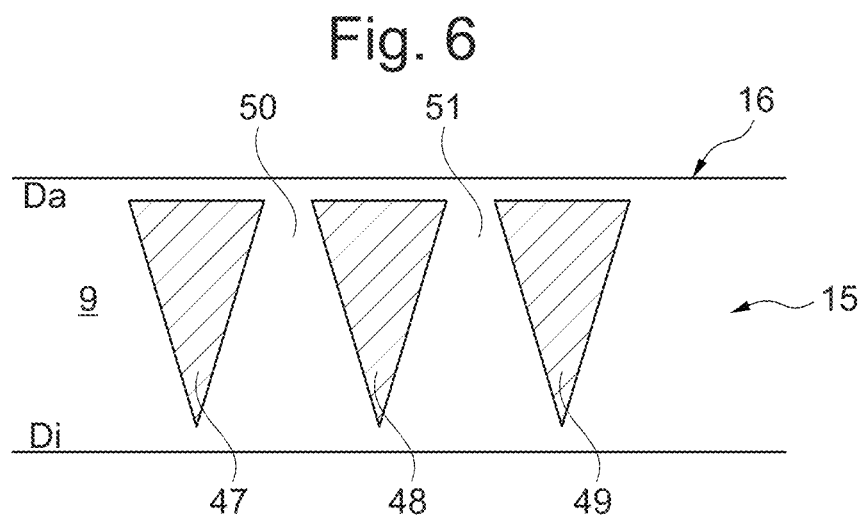

FIG. 7 shows how triangular friction lining elements 47 to 49 can also be arranged the other way round than in FIG. 6, with their tip radially on the inside. The resulting radial slots 50, 51 narrow in a nozzle-like manner from radially inside to radially outside. The narrowing, nozzle-like slot crosssection on the outer diameter Da of the friction surface 16 generates an increase in pressure in the lubricating gap.

If there is no corrugation in the carrier disk, this can lead to improved separation behavior of the disks. The drag torque can be effectively reduced by an optimal distribution of the disks in the open state of the multi-disk clutch 1.

Figure 8:
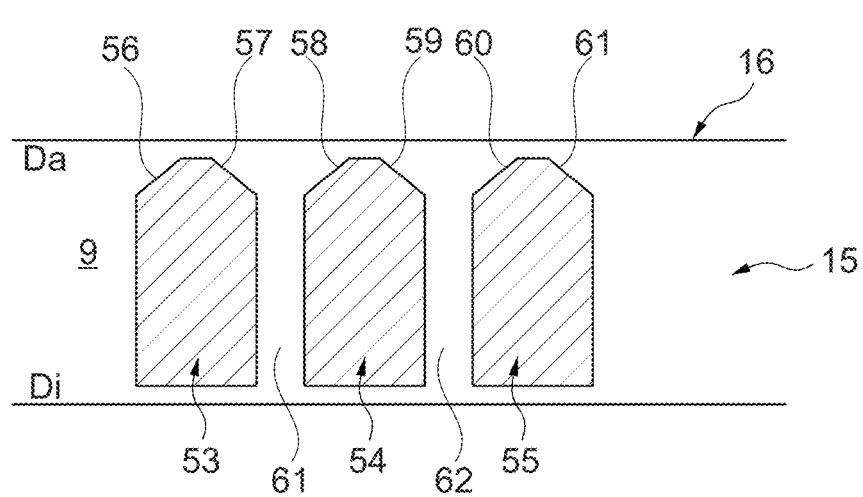

The embodiment shown in FIG. 8 is similar to the embodiment shown in FIG. 4. Friction lining elements 53, 54, 55 are each equipped with two bevels 56, 57; 58, 59; 60, 61 on the outer diameter Da. The resulting radial slots 61, 62 formed between the friction lining elements 53 to 55 extend in the region of the bevels 57, 58; 59, 60 on the outer diameter Da of the friction surface 16 in a funnel-like manner. This improves the drawing-in of air with a slight reduction in frictional contact area.

Figure 9:
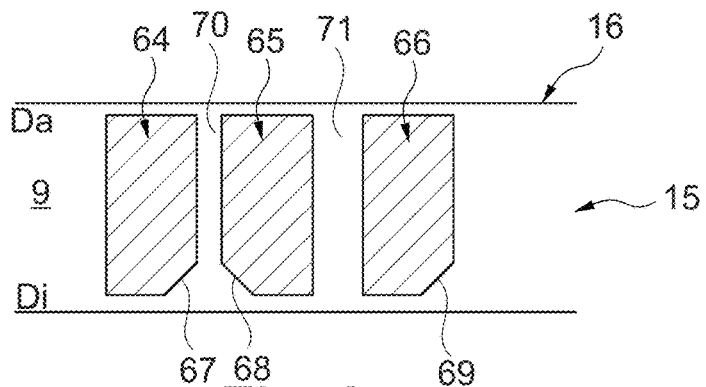

FIG. 9 shows that friction lining elements 64, 65, 66 can also be provided with bevels 67,68,69 on the inner diameter Di of friction surface 16. The bevels 67, 68 of the friction lining elements 64, 65 face one another in such a way that a radial slot 70 formed between the friction lining elements 64 and 65 extends in the conformation of a funnel on the inner diameter Di. A radial slot 71 between the friction lining elements 65, 66, on the other hand, is designed without bevels.

The slot 70 with the funnel-like extension on the inner diameter Di creates a lubricating wedge when the multi-disk clutch 1 is closed and supports the separation of the disks when opening. The slot 71 without bevels helps to reduce the risk of the friction part 15 floating when closing. The radial slot 71 thus contributes to ensuring that the multi-disk clutch 1 closes gently.

Figure 10:
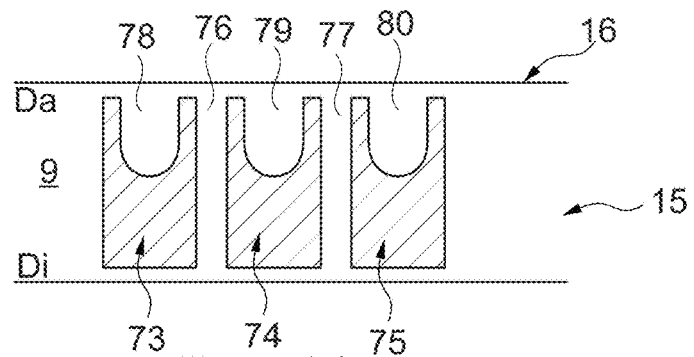
Figure 11:
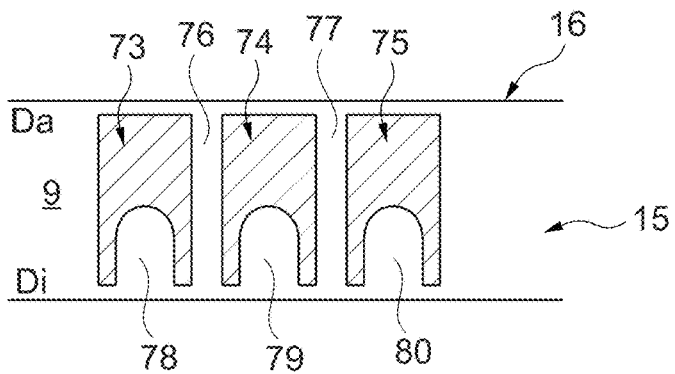
Figure 12:
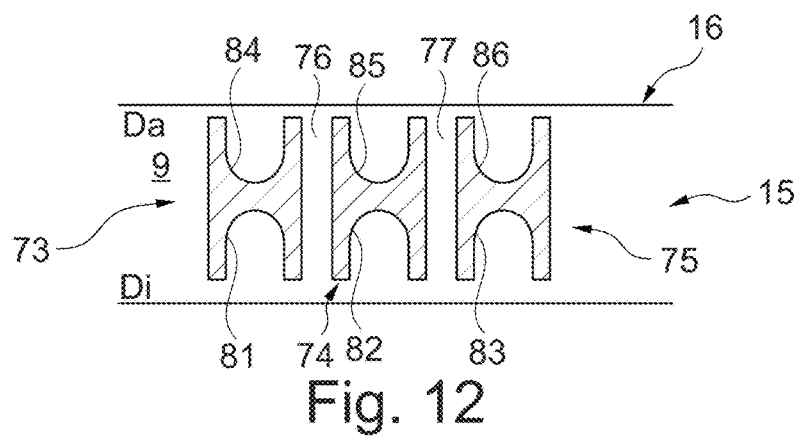

In FIGS. 10 to 12, three rectangular friction lining elements 73, 74, 75 are spaced apart from one another in the circumferential direction in such a way that radial slots 76, 77 are formed. The friction lining elements 73 to 75 are provided with recesses on the outer diameter Da in FIG. 10, on the inner diameter Di in FIG. 11 and on both the inner diameter Di and the outer diameter Da in FIG. 12, in order to form blind slots 78, 79, 80; 81 to 86.

The blind slots 78 to 80 in FIG. 10 are open radially on the outside. The blind slots 78 to 80 in FIG. 11 are open radially on the inside. The blind slots 81 to 83 in FIG. 12 are also open radially on the inside. The blind slots 84 to 86 in FIG. 12 are open radially on the outside.

With the blind slots 78 to 80 in FIGS. 10 and 84 to 86 in FIG. 12 on the outer diameter Da, a dead center with a corresponding pressure reduction is produced in the medium flow. This improves the drawing-in of air and leads to reduced drag torque.

The blind slots 78 to 80 in FIGS. 11 and 81 to 83 in FIG. 12 on the inner diameter Di cause the medium to accumulate in the lubricating gap. This leads to improved separation behavior. At the same time, the cooling effect of the medium is improved when the multi-disk clutch 1 is in the closed state, since the convective heat transfer in the blind slots is improved.

REFERENCE NUMERALS

1 Wet-running multi-disk clutch
2 Inner multiple disk carrier
3 Outer multiple disk carrier
4 Axis of rotation
5 Rotation speed
6 Rotation speed
7 Steel disk
8 Lined disk
9 Lining carrier
10 Coupling region
11 Friction lining
12 Friction lining
13 Arrow
14 Arrow
15 Friction part
16 Friction surface
20 X-axis
21 Y-axis
22 Y-axis
23 Y-axis
24 Drawn-in volume flow
25 Supplied volume flow
26 Drawing-in of air
27 Drag torque
28 Drawing-in of air
30 Drag torque curve
31 Friction lining element
32 Friction lining element
33 Friction lining element
34 Slot
35 Slot
37 Tangential slot
38 Tangential slot
39 Tangential slot
41 Friction lining element
42 Friction lining element
43 Friction lining element
44 Slot
45 Slot
47 Friction lining element
48 Friction lining element
49 Friction lining element
50 Slot
51 Slot
53 Friction lining element
54 Friction lining element
55 Friction lining element
56 Bevel
57 Bevel
58 Bevel
59 Bevel
60 Bevel
61 Slot
62 Slot
64 Friction lining element
65 Friction lining element
66 Friction lining element
67 Bevel
68 Bevel
69 Bevel
70 Slot
71 Slot
73 Friction lining element
74 Friction lining element
75 Friction lining element
76 Slot
77 Slot
78 Blind slot
79 Blind slot
80 Blind slot
81 Blind slot
82 Blind slot
83 Blind slot 84 Blind slot
85 Blind slot
86 Blind slot

The invention claimed is:

1. A friction part for a frictionally working device, having friction lining elements which are arranged with radial slots between one another so as to form a friction surface in the form of a circular disk, which radial slots can be traversed from radially inside to radially outside of the friction surface by a coolant or a lubricant, wherein the radial slots are connected to one another by tangential slots, wherein the friction lining elements are not divided in a circumferential direction and divided in a radial direction to form the tangential slots, adjacent tangential slots in the circumferential direction are offset from one another in the radial direction, and a width of each radial slot increases from radially inside to radially outside by decreasing a width of each friction lining element from radially inside to radially outside.

2. The friction part according to claim 1, wherein the friction lining elements are designed and relatively spaced apart from one another in such a way that the radial slots extend in a diffuser-like manner in the radial direction in relation to the friction surface from radially inside to radially outside.

3. A wet-running clutch or brake comprising at least one friction part according to claim 1.

4. A friction part for a frictionally working device, comprising:
a plurality of friction lining elements arranged to form a circular disk-shaped friction surface having radial slots disposed between the friction lining elements, wherein:
the radial slots are arranged to receive a coolant or lubricant traversing from a radial inside of the friction surface to a radial outside of the friction surface;
the radial slots are connected to one another by tangential slots; and
the plurality of friction lining elements is radially divided to form the tangential slots;
circumferentially adjacent tangential slots are offset from one another in a radial direction; and
a width of each radial slot increases from the radially inside to the radially outside by decreasing a width of each friction lining element from the radially inside to the radially outside.

5. The friction part of claim 4, wherein the radial slots extend in a diffuser-like manner from the radial inside to the radial outside.

6. The friction part of claim 4, wherein each of the plurality of friction lining elements is formed as an isosceles trapezoid or an acute-angled triangle.

* * * * *